US012401163B2

(12) United States Patent
Agee et al.

(10) Patent No.: US 12,401,163 B2
(45) Date of Patent: Aug. 26, 2025

(54) SINGLE PAIR CONNECTOR MODULE

(71) Applicant: Panduit Corp., Tinley Park, IL (US)

(72) Inventors: Teresa Agee, Schererville, IN (US); Robert E. Fransen, Orland Park, IL (US); Roman J. Churnovic, Manhatttan, IL (US)

(73) Assignee: Panduit Corp., Tinley Park, IL (US)

( * ) Notice: Subject to any disclaimer, the term of this patent is extended or adjusted under 35 U.S.C. 154(b) by 385 days.

(21) Appl. No.: 17/945,296

(22) Filed: Sep. 15, 2022

(65) Prior Publication Data

US 2023/0132737 A1 May 4, 2023

Related U.S. Application Data

(60) Provisional application No. 63/272,774, filed on Oct. 28, 2021.

(51) Int. Cl.
*H01R 13/74* (2006.01)
*H01R 13/42* (2006.01)
*H01R 13/512* (2006.01)

(52) U.S. Cl.
CPC ........... *H01R 13/743* (2013.01); *H01R 13/42* (2013.01); *H01R 13/512* (2013.01)

(58) Field of Classification Search
CPC ..... H01R 13/42; H01R 13/512; H01R 13/743
USPC ................................ 439/695, 810, 814, 536
See application file for complete search history.

(56) References Cited

U.S. PATENT DOCUMENTS

| | | | | |
|---|---|---|---|---|
| 4,904,209 A * | 2/1990 | Nelson | H01R 24/62 | 439/736 |
| 6,234,836 B1 * | 5/2001 | Schmidt | H01R 13/743 | 439/676 |
| 7,086,908 B2 * | 8/2006 | Fukuzaki | H01R 13/42 | 439/669 |
| 7,294,026 B1 | 11/2007 | Donnell et al. | | |
| 7,568,950 B2 | 8/2009 | Belopolsky et al. | | |
| 7,628,657 B2 * | 12/2009 | Martich | H01R 27/00 | 439/367 |
| 7,670,060 B2 * | 3/2010 | Ziemke | H01R 13/502 | 385/58 |
| 7,695,328 B2 * | 4/2010 | Martich | H01R 27/00 | 439/862 |
| 7,914,334 B2 * | 3/2011 | Foratier | H01R 31/06 | 439/638 |
| 8,449,314 B1 * | 5/2013 | Feist | H01R 13/512 | 439/358 |
| 8,715,002 B2 * | 5/2014 | Fitzpatrick | H01R 27/00 | 439/557 |

(Continued)

FOREIGN PATENT DOCUMENTS

DE 202004000423 U1 4/2004

*Primary Examiner* — Phuong K Dinh
(74) *Attorney, Agent, or Firm* — Peter S. Lee; Christopher S. Clancy; James H. Williams

(57) ABSTRACT

A connector module is disclosed having physical dimensions for being installed into standardized, or pre-existing, structures such as a patch panel including pre-populated slot openings. The connector module provides simple field termination for different sized single pair cables using screw-down/cage-clamp for the bare single pair of conductors emerging from a centralized power equipment to be a pluggable mating connector terminating the field wires.

16 Claims, 9 Drawing Sheets

(56) References Cited

U.S. PATENT DOCUMENTS

| | | | | |
|---|---|---|---|---|
| 8,781,284 | B2 * | 7/2014 | Bragg | G02B 6/44526 361/627 |
| 9,247,657 | B2 * | 1/2016 | Row | H01R 13/516 |
| 9,698,584 | B2 * | 7/2017 | Shotey | H01R 13/447 |
| 9,831,611 | B2 * | 11/2017 | Lehmann | H01R 13/10 |
| 9,843,144 | B2 * | 12/2017 | Mortun | H01R 24/62 |
| 10,139,581 | B2 * | 11/2018 | Ishimine | H01R 13/518 |
| 10,349,536 | B2 * | 7/2019 | Li | H01R 13/665 |
| 10,446,952 | B2 * | 10/2019 | Fanduzzi | H01R 9/24 |
| 11,228,818 | B2 * | 1/2022 | Shih | H01R 13/743 |
| 11,276,969 | B2 * | 3/2022 | Calloway | H01R 13/518 |
| 11,362,458 | B2 * | 6/2022 | Stikeleather | H01R 13/518 |
| 2021/0021076 | A1 | 1/2021 | Fritz et al. | |

* cited by examiner

SINGLE PAIR CONNECTOR MODULE

CROSS-REFERENCE TO RELATED APPLICATION(S)

This application claims benefit to U.S. Provisional Patent Application No. 63/272,774, filed Oct. 28, 2021, the entirety of which is hereby incorporated by reference herein.

FIELD OF THE TECHNOLOGY

This disclosure relates to a connector module having a connector for receiving a single pair of wires (i.e., conductors) and an adapter housing for accepting the connector and having characteristic dimensions for fitting into existing patch panel ports. This connector module provides a simple and effective solution for field termination of a range of single pair cables.

BACKGROUND

Throughout the course of installing equipment within a structure, many different types of cables having different sized wire conductors may be used for different applications having different power rating requirements. For example, in the distributed antenna system (DAS) industry cable of various sizes may be used during an installation to distribute power from a centralized telecom or electrical closet in a building to antennas distributed throughout the interior of the building, which may consist of many stories. Conventional zone cabling enclosures do not provide a simple termination point for conductors having such a wide range of size and power ratings.

SUMMARY

This disclosure provides a simple field termination solution for single pair cable (i.e., cable including a single pair of wire conductors) within a range of sizes (e.g., 12-26 AWG) to utilize more standardized connector components.

According to an embodiment, a connector module for installing into an equipment opening is provided. The connector module comprising an adapter configured to receive a connector jack, the adapter comprising: a top surface, a first side wall, a second side wall opposite the first side wall, a front side surface including an opening for receiving the connector jack, and a bottom surface, wherein at least a portion of the top surface, a portion of the first side wall, a portion of the second side wall, a portion of the front side surface, and a portion of the bottom surface form an internal cavity for housing the connector jack.

DETAILED DESCRIPTION

This disclosure describes embodiments of a connector module having physical dimensions for being installed into standardized, or pre-existing, structures such as a patch panel including pre-populated slot openings having characteristics for fitting the connector module. The connector module disclosed herein is configured to provide simple field termination for different sized single pair cables (e.g., 12-26 AWG) using screw-down/cage-clamp for the bare single pair of conductors emerging from a centralized power equipment to be a pluggable mating connector terminating the field wires. A number of compatible, common-pitch-mating connectors can be snapped into a rear of rack-mountable panels once the field wiring conductors have been screwed down into the cage clamps. This gives a central and flexible (e.g., pluggable) head-end to field-wiring demarcation point that can greatly assist in overall installation and troubleshooting.

Figure 1:
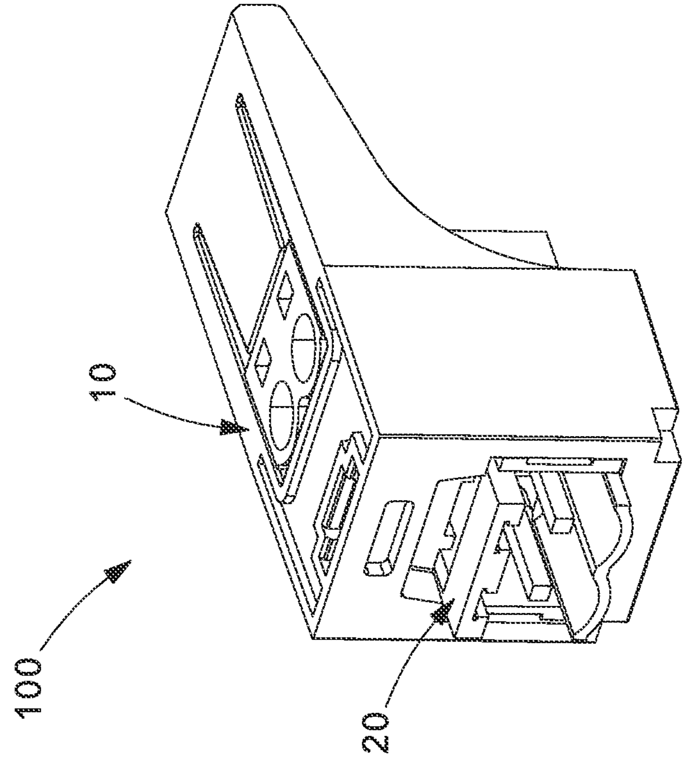
FIG. 1 is a perspective view of a connector module in an assembled state, according to an embodiment.

FIG. 1 shows a connector module 100 comprising a connector 20 (e.g., connector jack) and an adapter 10. In FIG. 1, the connector module 100 is shown to be in an assembled state where the connector 20 is fully inserted and secured to the adapter 10.

Figure 2:
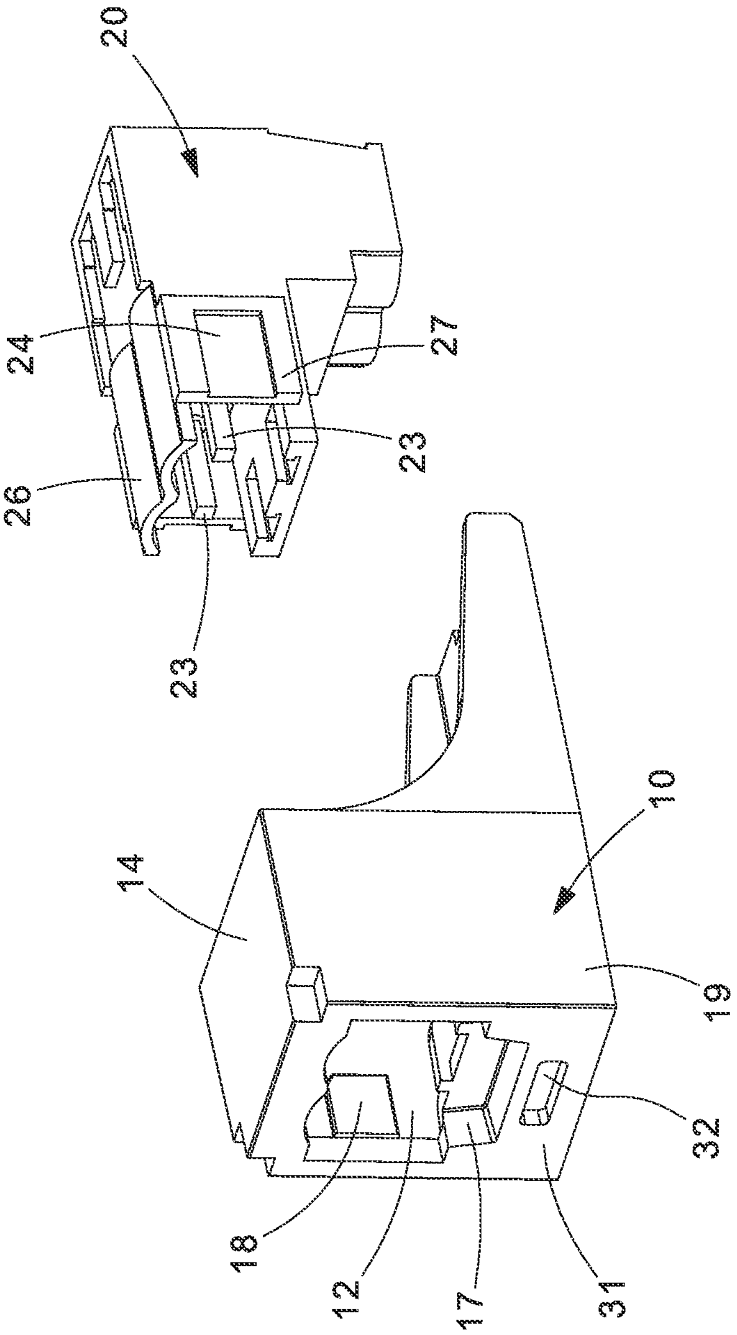
FIG. 2 is a perspective view of the connector module shown in FIG. 1 in a disassembled state to show an adapter and a connector that comprise the connector module.
Figure 5:
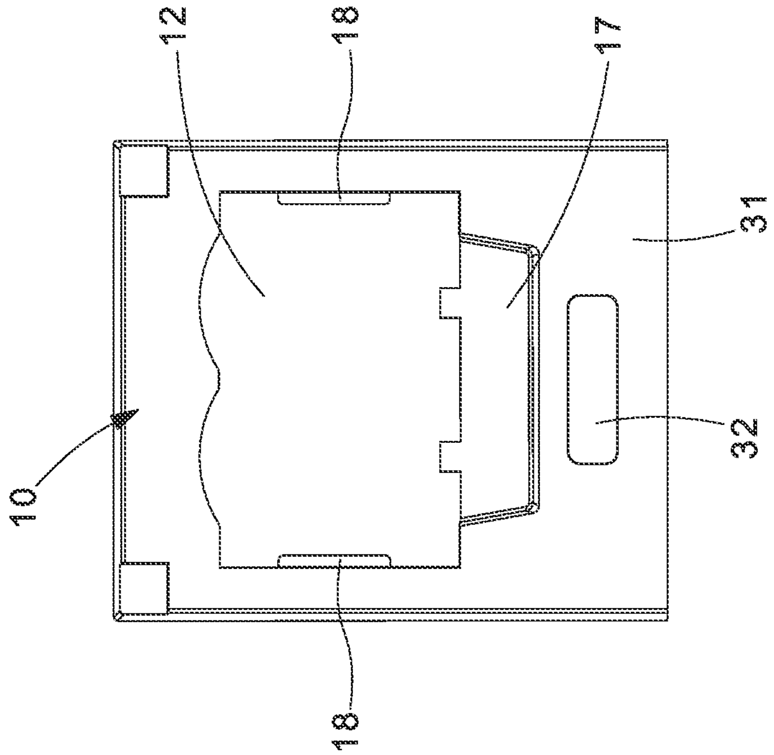
FIG. 5 is a front side view of the adapter.

FIG. 2 shows the connector module 100 in a disassembled state where the connector 20 is not inserted into the adapter 10. In the view illustrated by FIG. 2 a top surface 14 of the adapter 10 is seen to be flat other than some exemplary notches at two of the corners. The adapter 10 also includes two opposing side walls 19, as well as a front side surface 31. The front side surface 31 includes an opening 12 through which a prong housing 26 of the connector 20 may be inserted through when the connector is inserted into the adapter 10 via a rear side. The front side surface 31 also includes a slot 17 at a bottom end of the opening 12 that provides a space that may be utilized to better insert the connector 20 into the adapter 10, and/or remove the connector 20 from the adapter 10. The front side surface 31 also includes an icon pocket 32 where an icon piece may fit into, and or an adhesive backed label may be placed. A head-on front side view of the adapter 10 is also illustrated in FIG. 5.

From the perspective view illustrated in FIG. 2, the connector 20 is shown to include the prong housing 26 which is a protrusion that is inserted through the adapter 10 to stick out, at least in part, past the opening 12 of the adapter 10. The prong housing 26 includes an inner chamber housing two prongs 23 for mating to corresponding mating components of a plug.

Figure 4:
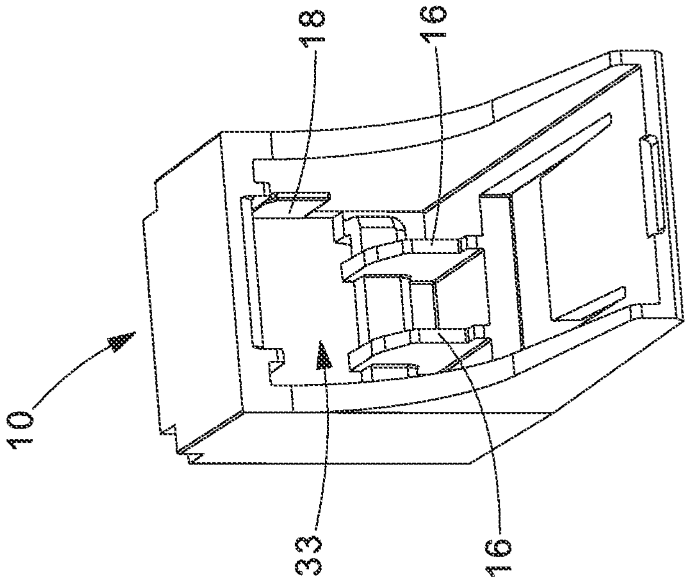
FIG. 4 is a rear perspective view showing an internal cavity of the adapter.
Figure 6:
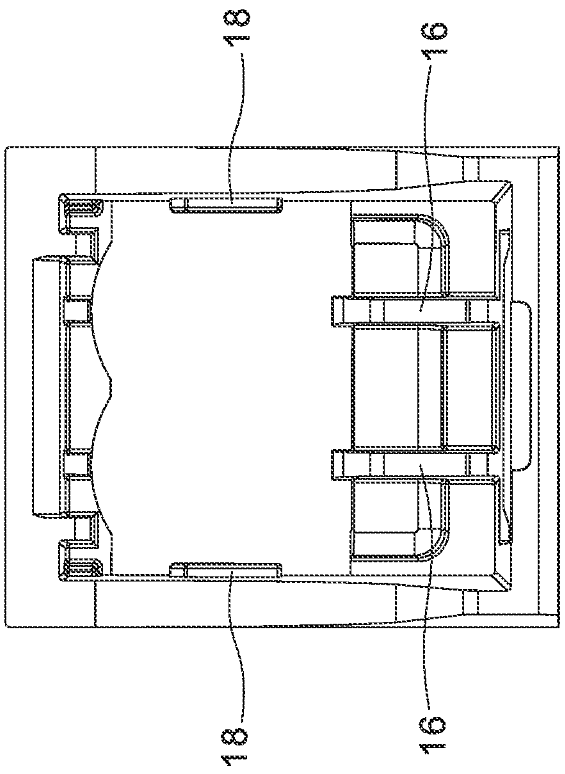
FIG. 6 is a rear side view of the adapter.

The connector 20 also includes two detents 24, one on each opposite side wall 27 of the prong housing 26. When the connector 20 is inserted into an inner cavity 33 of the adapter 10, protrusions 18 within the inner cavity 33 are configured to slide and fit into respective detents 24 on the side walls 27 of the prong housing 26. A rear side perspective view of the adapter 10 is illustrated in FIG. 4 and a rear side head-on view of the adapter 10 is illustrated in FIG. 6, where the protrusions 18 are shown to be positioned on opposite sides of the inner cavity 33. The fitting of the protrusions 18 from the inner cavity 33 of the adapter 10 into the detents 24 of the connector 20 aids in providing a more secure installation and attachment of the connector 20 to the adapter 10 when assembling the connector module 100.

Figure 3:
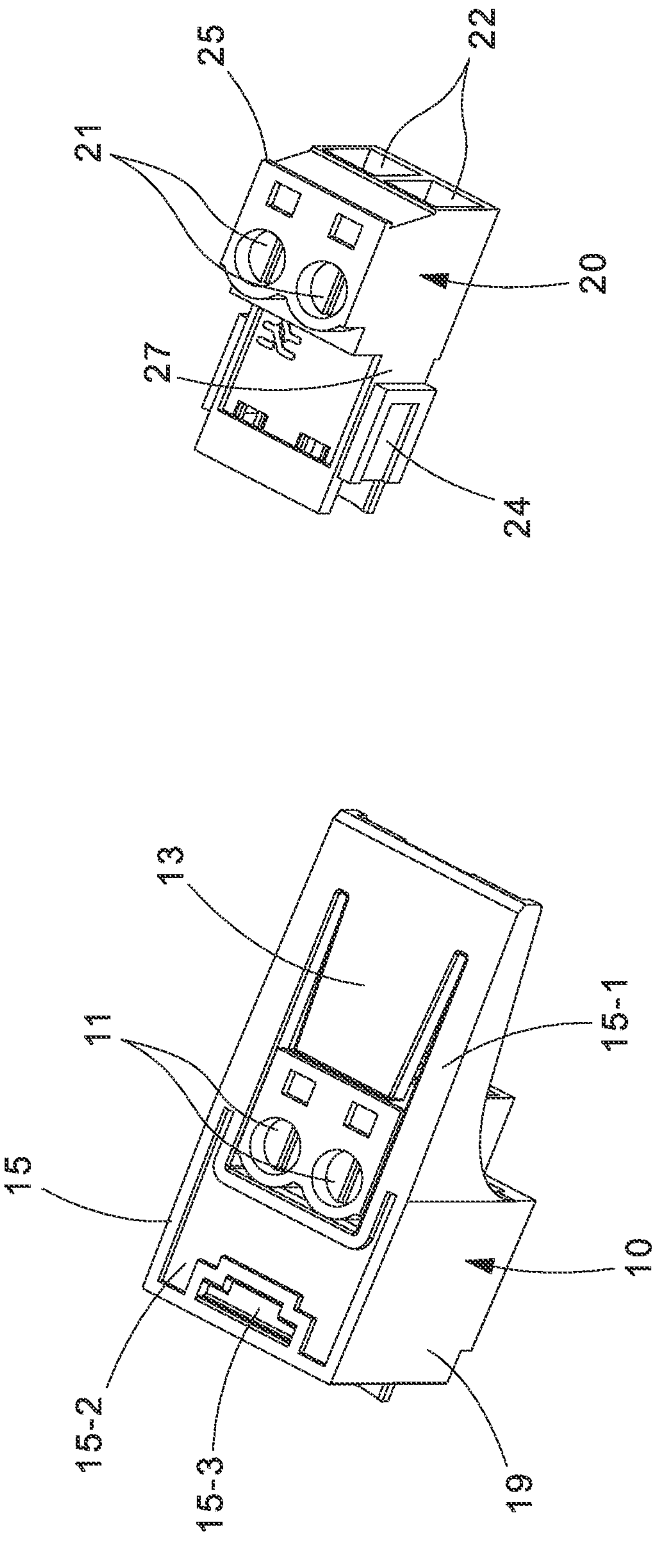
FIG. 3 is a perspective view showing a bottom surface of the adapter and the connector illustrated in FIG. 2.

FIG. 3 shows a bottom side perspective view of the adapter 10 and the connector 20. A bottom surface 15 of the adapter 10 includes a thinner surface area 15-2 where a material (e.g., plastic) of the bottom surface 15 has been thinned out, and a front latching feature 15-3 for snapping the adapter 10 into a panel or faceplate. The bottom surface 15 also includes an extension portion 15-1 that extends beyond a plane of the top surface 14. The extension portion 15-1 includes a latch 13 for securing the connector 20 within the adapter 10 by engaging an edge 25 of the connector 20 when the connector 20 is inserted into the adapter 10. The bottom surface 15 also includes two holes 11 that are configured to line up with two holes 21 on the connector 20 when the connector is inserted into the adapter 10 into the assembled state. A screw is configured to be inserted and rotated into the holes 11, 21 to screw down and secure wire conductors that are being housed within the connector 20 after being inserted into the connector 20 via the wire openings 22.

From the rear side views into the inner cavity 33 of the adapter 10 illustrated in FIGS. 4 and 6, two fit extensions 16 are shown to extend up from the bottom surface 15. The fit extensions 16 are positioned and sized to provide a firm fit of the connector 20 into the inner cavity 33 of the adapter 10 when the connector module is in the assembled state. According to other embodiments, one or more fit extensions 16 may be included within the inner cavity 33. For example, a single fit extension having a greater width may be used in place of the two fit extensions 16 shown in FIG. 4 according to other embodiments. As another example, one or more additional fit extensions 16 may be further added to the two fit extensions 16 shown in FIG. 4 according to other embodiments.

Figure 7:
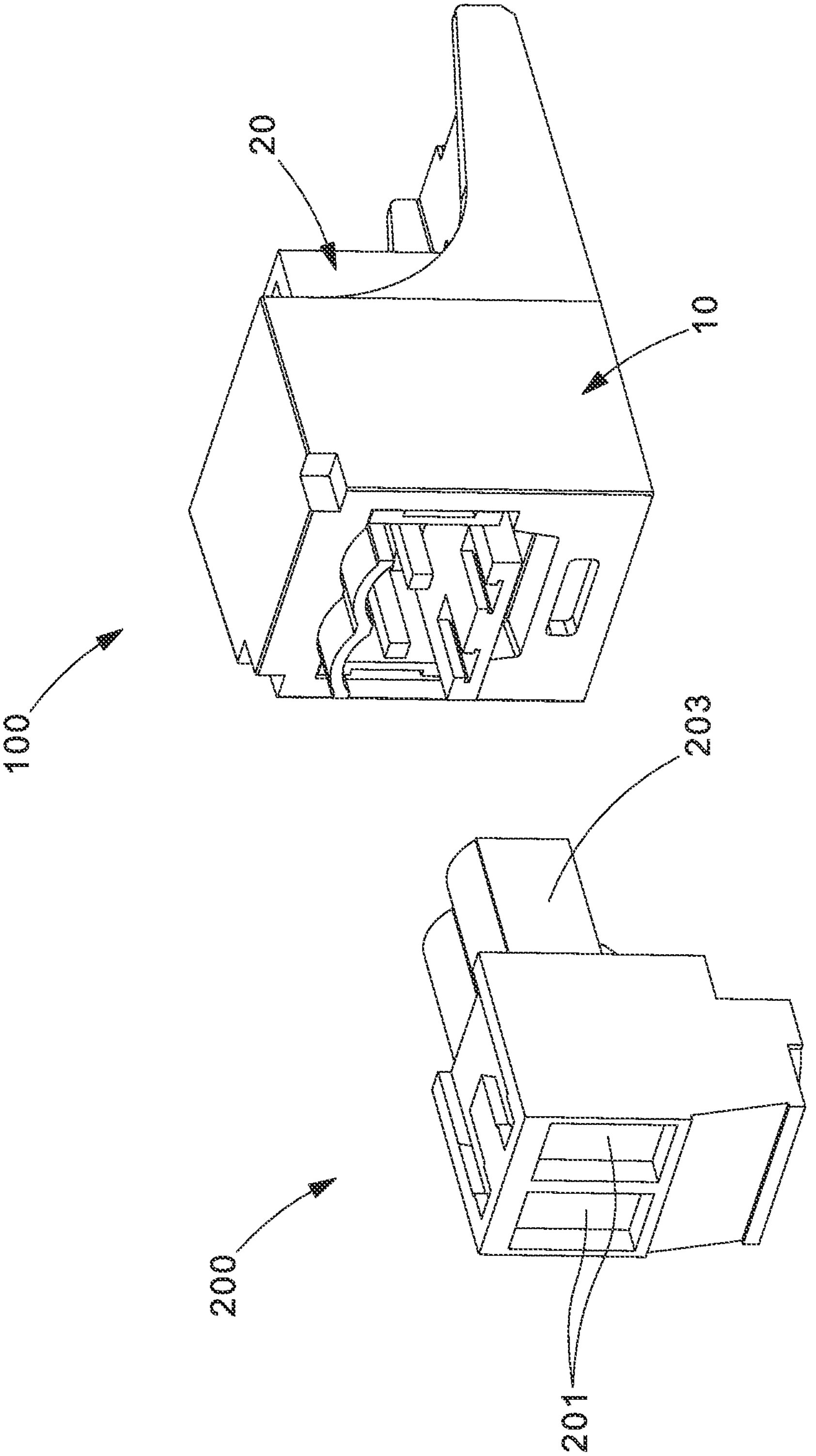
FIG. 7 is a perspective view of the connector module preparing to receive a plug, according to some embodiments.
Figure 8:
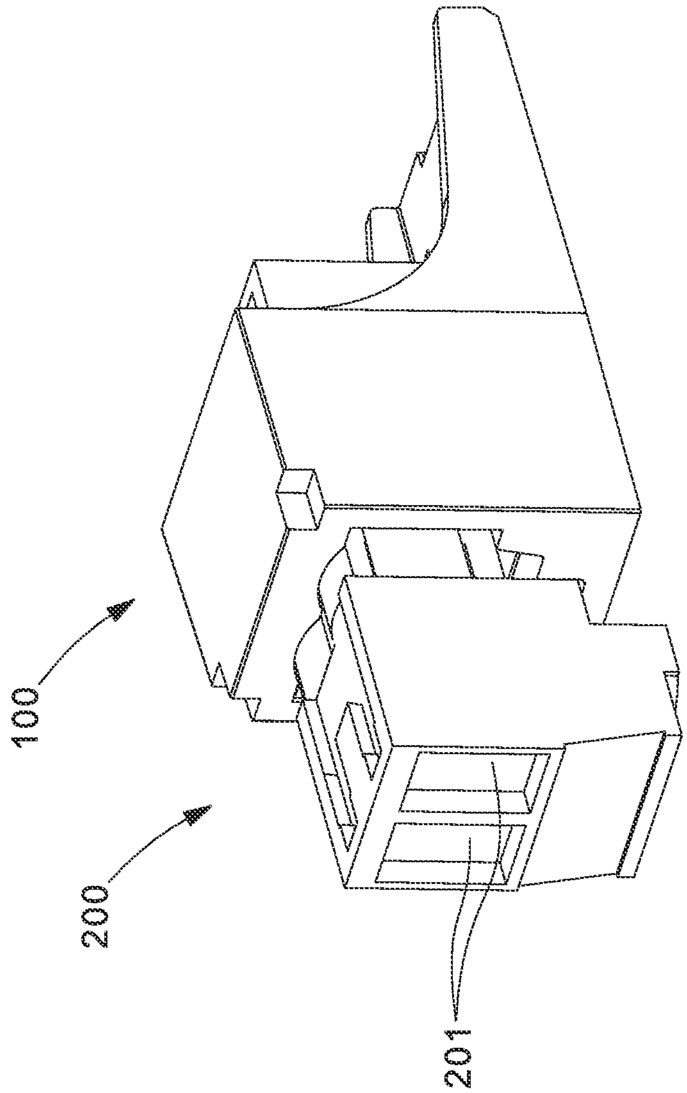
FIG. 8 is a perspective view of the plug inserted into the connector module, according to some embodiments.

FIG. 7 shows the connector module 100 in the assembled state and prepared to receive a corresponding plug 200. The plug 200 includes a mating extension 203 configured to be inserted into the prong housing 26 of the connector 20, where mating components inside the mating extension 203 of the plug 200 are configured to mate with the two prongs 23 inside the prong housing 26 of the connector 20 to result in an electronic coupling between the plug 200 and the connector 20. FIG. 8 shows the plug 200 being mated to the connector 20 in the assembled connector module 100.

The plug 200 includes two wire openings 201 at a rear surface, where each of the wire openings 201 are configured to receive a respective wire conductor from a single pair of wires (e.g., single pair cable). As provided by the exemplary installation of the connector module 100 into network equipment 300 shown in FIG. 9, a first wire 41 and a second wire 42 from a single pair cable may be terminated and secured into the plug 200 by twisting down screws into two holes 202 in the plug 200. Then the plug 200 may be simply mated to the corresponding connector 20 that has already been attached to the network equipment 300 using the adapter 10 portion of the connector module 100. So the adapter 10 is configured to have the predetermined size, shape, and coupling mechanisms to fit into a port opening 301 in the network equipment 300 and be secured within the port opening 301.

Figure 9:
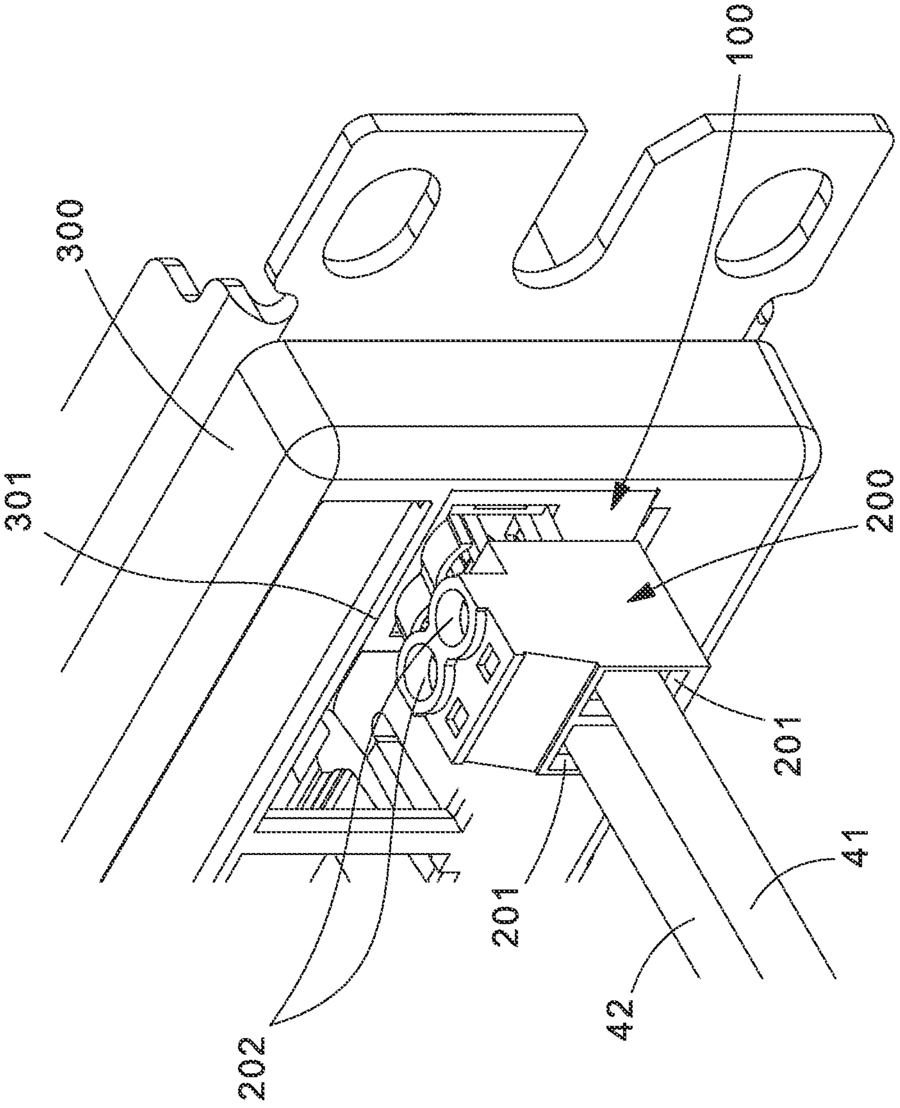
FIG. 9 is a perspective view of a single pair cable installed into a plug, where the plug is inserted into the connector module that has been installed into a patch panel, according to some embodiments.

In FIG. 9 the network equipment 300 is shown to be a patch panel, but other types of network equipment that may be used for communicating using single pair cables may also be applicable for utilizing the connector module 100. In particular, FIG. 9 shows the connector module 100 installed into a port opening 301 provided on the network equipment 300, where the connector module 100 includes a Panduit Mini-Com adapter and the network equipment 300 is a patch panel where the port opening 301 has characteristics to fit the Panduit Mini-Com adapter.

It follows that the connector module 100 offers a simple and effective solution for terminating and coupling single pair cables in various use-case environments. For example, the single pair cables may be used for transmitting power using pulsed power systems to power components in a DAS installation environment.

Furthermore, while the particular embodiments described herein have been shown and described, it will be obvious to those skilled in the art that changes and modifications may be made without departing from the teaching described herein with reference to the connector module 100. The matter set forth in the foregoing description and accompanying drawings is offered by way of illustration only and not as limitation. The actual scope of the disclosure is intended to be defined in the following claims when viewed in their proper perspective.

What is claimed is:

1. A connector module for installing into an equipment opening, the connector module comprising:

an adapter configured to receive a connector jack, the adapter comprising:

a top surface;

a first side wall;

a second side wall opposite the first side wall;

a front side surface including an opening for receiving the connector jack; and a bottom surface including a pair of adapter screw holes configured to receive a pair of screws; and wherein an internal cavity for housing the connector jack is formed by at least a portion of the top surface, a portion of the first side wall, a portion of the second side wall, a portion of the front side surface, and a portion of the bottom surface, wherein the connector jack includes a pair of connector screw holes configured to line up with the adapter pair of screw holes when the connector jack is housed within the internal cavity.

2. The connector module of claim 1, the front side surface further including a slot located at a bottom end of the opening.

3. The connector module of claim 1, the internal cavity comprising:

at least one fit extension configured to adapt the connector jack inside the internal cavity.

4. The connector module of claim 1, the internal cavity comprising:

at least one protrusion, wherein the at least one protrusion is configured to fit within a respective detent included on the connector jack.

5. The connector module of claim 1, wherein the adapter is configured to snap fit into a pre-determined opening included in a networking equipment.

6. The connector module of claim 5, wherein the networking equipment is a patch panel.

7. The connector module of claim 1, wherein the connector jack includes two conductor prongs for engaging corresponding mating components of a connector plug inserted into the connector jack.

8. The connector module of claim 1, wherein the connector jack includes two wire openings configured to lead into respective wire housings, each wire opening configured to receive a respective wire conductor from a single pair of conductors such that at least a portion of each wire conductor is housed within the respective wire housings, and wherein the pair of screws are configured to fasten down through the adapter pair of screw holes and the connector pair of screw holes to clamp down on the wire conductors housed within the respective wire housings.

9. The connector module of claim 8, wherein the respective wire conductor is 12 AWG or higher.

10. The connector module of claim 1, wherein when the connector jack is housed inside the internal cavity, the opening of the front side faces perpendicular to an opening for screw holes included on a bottom surface of the connector jack.

11. A connector jack comprising:

a prong housing forming an inner chamber, the inner chamber including at least two prongs;

a first side wall, the first side wall including a first detent configured to receive a first protrusion included in an inner cavity of an adapter when the connector jack is installed into the adapter;

a second side wall, the second side wall including a second detent configured to receive a second protrusion included in the inner cavity of the adapter when the connector jack is installed into the adapter;

a pair of connector screw holes located on a bottom surface of the connector jack, wherein the pair of connector screw holes are configured to line up to a corresponding pair of adapter screw holes on a bottom surface of the adapter when the connector jack is installed into the adapter such that a pair of screws are configured to pass through both the pair of connector screw holes and the pair of adapter screw holes when the connector jack is installed into the adapter; and at least two wire openings configured to receive a respective wire conductor from a single pair of conductors.

12. The connector jack of claim 11, wherein an opening for the screw holes are perpendicular to an opening of the inner chamber.

13. The connector jack of claim 11, wherein the at least two wire openings face a different direction from an opening of the inner chamber.

14. The connector jack of claim 11, wherein the at least two wire openings are configured to receive 12 AWG or higher wire conductors.

15. The connector jack of claim 11, wherein the conductor jack is configured to be installed into an adapter, the adapter comprising:

a top surface;

a first side wall;

a second side wall opposite the first side wall;

a front side surface including an opening for receiving the connector jack; and wherein an internal cavity for housing the connector jack is formed by at least a portion of the top surface, a portion of the first side wall, a portion of the second side wall, a portion of the front side surface, and a portion of the bottom surface.

16. The connector jack of claim 11, wherein each wire opening is configured to lead into respective wire housings, and each wire opening is configured to receive the respective wire conductor from the single pair of conductors such that at least a portion of each wire conductor is housed within the respective wire housings, and wherein the pair of screws are configured to fasten down through the adapter pair of screw holes and the connector pair of screw holes to clamp down on the wire conductors housed within the respective wire housings.

* * * * *